United States Patent [19]

Braun et al.

[11] 4,140,666

[45] Feb. 20, 1979

[54] PROCESS FOR THE MANUFACTURE OF PLASTICS DISPERSIONS

[75] Inventors: Helmut Braun, Hofheim; Rolf Reinecke, Wiesbaden; Werner Stelzel, Bad Soden, all of Fed. Rep. of Germany

[73] Assignee: Hoechst Aktiengesellschaft, Frankfurt am Main, Fed. Rep. of Germany

[21] Appl. No.: 788,756

[22] Filed: Apr. 19, 1977

Related U.S. Application Data

[63] Continuation of Ser. No. 626,982, Oct. 29, 1975, abandoned.

[30] Foreign Application Priority Data

Oct. 31, 1974 [DE] Fed. Rep. of Germany ....... 2451719

[51] Int. Cl.$^2$ .................. C08L 27/06; C08L 33/00
[52] U.S. Cl. .................. 260/29.6 AN; 260/29.6 T; 260/29.6 MN; 260/29.6 ME; 260/42.2

[58] Field of Search ............ 260/29.6 T, 29.6 TA, 260/29.6 BE, 29.6 ME, 29.6 W, 29.6 AT, 29.6 RW, 29.6 CW, 29.6 E, 29.6 MN, 29.6 AN, 42.21

[56] References Cited

U.S. PATENT DOCUMENTS

| 3,404,114 | 10/1968 | Snyder et al. | 260/29.6 N |
|---|---|---|---|
| 3,819,557 | 6/1974 | Loeffler et al. | 260/29.6 TA |
| 3,926,890 | 12/1975 | Huang et al. | 260/29.6 TA |
| 3,988,281 | 10/1976 | Minami et al. | 260/29.6 N |

Primary Examiner—Lorenzo B. Hayes
Attorney, Agent, or Firm—Curtis, Morris & Safford

[57] ABSTRACT

The wet adhesion of plastics dispersions and of paints made therewith is widely improved, if in the manufacture of the dispersions a nucleophilically substitutable $\alpha$-$\beta$-unsaturated halogen compound in an amount of 0.5 to 10% by weight calculated on the total amount of monomers is copolymerized, and the dispersion so obtained is reacted with ammonia at a temperature of at least 50° C.

8 Claims, No Drawings

PROCESS FOR THE MANUFACTURE OF PLASTICS DISPERSIONS

This is a continuation, of application Ser. No. 626,982 filed Oct. 29, 1975 now abandoned.

This invention relates to a process for the manufacture of plastics dispersions suitable for making dispersion paints having a good wet adhesion, i.e., when wetted after drying.

The problem of the wet adhesion, i.e., the adhesion of dried paints on wetting, of dispersion paints on smooth nonabsorbent surfaces has limited for a long time the use of such dispersion paints. Dispersion paints having a low pigment content, which dry on the substrate with formation of a glossy or slightly dull film, have a poor adhesion to smooth non-absorbent surfaces when the paints are rewetted after drying. The wet adhesion is especially unsatisfactory with fresh paints which have not yet undergone ageing.

Dispersion paints of low pigment content are chosen when a washable coat of paint is desired. Owing to the high binder content of the paint a closed washable film is formed. Dispersion paints drying with formation of a glossy or slightly dull film also have a concentration by volume of pigment of less than 40%, generally the concentration is in the range of from about 10 to 25%. They also contain about 3 to 15% of organic solvents to improve the gloss and flow, to prolong the working time and for film consolidation, for example polyhydric alcohols miscible with water and having up to 6 carbon atoms, especially ethylene and propylene glycol, or the monomethyl to monobutyl ethers thereof. To improve the film consolidation solvents having a restricted solubility in water are used, such as the monoglycol ethers of carboxylic acids and more particularly esters of carboxylic acids with monoalkyl ethers of glycols or oligoglycols. Butyl diglycol acetate is one of the most widely used representatives of this group. The combination of a low pigment content with a relatively high solvent content has a very detrimental effect on the wet adhesion of the coats of dispersions paints.

With a poor wet adhesion paints formulated to give washable coats do not have this property when applied to smooth non absorbent surfaces, for example old coats of alkyd or oil paint. In moist rooms, such as kitchen, bath rooms, or industrial places, where water of condensation may form, the new coat may detach from the substrate if the wet adhesion is not sufficient. Moreover, a poor wet adhesion complicates painting. When, for example, the base and the upper half of a wall or the wall and the ceiling are to be painted in different colors, the first coat of paint may be soiled with the different paint by slipping of the brush. In principle, the different paint could be wiped off with a wet cloth, but with a poor wet adhesion the first paint may then be damaged or even removed simultaneously.

Therefore, many attempts have been made to modify plastics dispersions in such a manner that the dispersion paints made therewith have the desired wet adhesion. In German Offenlegungsschrift No. 1,595,501 it has been proposed to prepare plastics dispersions by polymerizing suitable monomers in aqueous emulsion using as comonomers 0.2 to 15% by weight, calculated on the total amount of the monomers, of compounds carrying oxirane groups and then to react the copolymer at room temperature with ammonia or an amine. Suitable oxirane compounds, are, above all, glycidyl esters of acrylic and methacrylic acid, allyl glycidyl ethers or vinyl glycidyl ethers.

Dispersion paints prepared with plastics dispersions of this type have quite a good wet adhesion, but for many applications the wet adhesion is not at all sufficient.

It has now been found that plastics dispersions suitable for making dispersion paints having an excellent wet adhesion can be obtained by treating, at a temperature above 50° C., plastics dispersions, prepared by copolymerizing in aqueous medium suitable monomers with 0.5 to 10% by weight, calculated on the total amount of monomers, of nucleophilically substitutable $\alpha$-$\beta$-unsaturated halogen compounds, with ammonia in an amount of 2 equivalents of ammonia for each equivalent of nucleophilically substitutable halogen and, in addition, sufficient to adjust the pH of the hot dispersion to a value above 8.

Ammonia can be added to the finished dispersion in the form of a gas, of a liquid, or a solution. It is preferably used in the form of a concentrated or dilute aqueous solution. The ammonia is added in the after-reaction period, i.e., in the period between the end of polymerization and directly prior to cooling of the dispersion. It proved especially advantageous to add the ammonia in the form of an aqueous solution soon after termination of the polymerization and at least half an hour or one hour prior to cooling of the dispersion. In special cases, the ammonia may also be added to the cooled dispersion, whereupon the dispersion is heated for half an hour or 1 hour at a temperature above 50° C. If the copolymer contains free carboxyl groups in the latter case the dispersion should not be older than 1 day. The ammonia is preferably added at a temperature in the range of from 50° to 95° C. It proved advantageous to choose the temperature of polymerization.

If the ammonia is added at high temperature, for example above 95° C., considerable amounts of gas and foam may form. This can be avoided by operating under pressure and by adding defoaming agents, if necessary.

By reacting the halogen compound with ammonia at elevated temperature according to the invention a wet adhesion is obtained with a lower proportion of halogen compound in the copolymer comparable to that obtained if the reaction is carried out at room temperature. The dispersions obtained in accordance with the invention can be used for making paints having a high wet adhesion immediately after their preparation, whereas a reaction with ammonia in the cold necessitates a prolonged intermediate storage which, of course, slows down the production.

For each equivalent of halogen in the copolymer 2 mols ammonia are added. When the copolymer contains free carboxyl groups an additional amount of ammonia should be used for neutralization. Ammonia is added in such an amount that the hot dispersion has a pH above 8 and preferably above 9, measured with a glass electrode.

Instead of ammonia, which is used as a gas or preferably in aqueous solution, compounds splitting off ammonia at a temperature above 50° C. can be used, preferably hexamethylenetetramine. In this case, at least 1 mol of hexamethylenetetramine must be added for each mol of halogen. Dispersions which are not stable at a pH of about 6.5, adjustable with hexamethylenetetramine, especially dispersions of acrylate homopolymers, must be rendered more alkaline by adding ammonia.

The amount of halogen compound used can vary in the range of from 0.5 to 10% by weight, calculated on the total amount of monomers used. With a content of less than 0.5% the wet adhesion strongly diminishes while the addition of more than 10% by weight of halogen compound does not result in noticeable further improvement. In general, 1 to 3% by weight of halogen compound are sufficient. More than 10% halogen compound can be used if the dispersion is mixed with a dispersion free of halogen compound. In the manufacture of the dispersions according to the invention it proved advantageous to add the halogen compound to the polymerization mixture when at least 40% and up to 80% of the other monomers have polymerized. In this manner plastics dispersions are obtained which have a high wet adhesion with a lower proportion of halogen compound than if the halogen compound were added continually during the course of polymerization together with the other monomers. In this manner up to 60% of halogen compound can be saved.

The halogen compounds to be used in the manufacture of the dispersions according to the invention are $\alpha$-$\beta$-unsaturated compounds containing at least one nucleophilically substitutable halogen, for example chlorine or bromine, for example chloro- or bromo-acetic acid vinyl ester, $\beta$-chloroethyl-vinyl ether, $\beta$-chloroethyl acrylate or methacrylate.

The selection of the other monomers is not critical. All monomers generally used for making plastics dispersions, which can be combined in accordance with the requirements of practice, are suitable, for example vinyl esters of organic carboxylic acids the acid moiety of which contains 1 to 30, preferably 1 to 20 carbon atoms, for example vinyl acetate, vinyl propionate, isononanoic acid vinyl ester and vinyl ester of branched monocarboxylic acids having up to 20 carbon atoms; esters of acrylic acid or methacrylic acid having from 1 to 30 and preferably 1 to 20 carbon atoms in the alcohol moiety, for example ethyl acrylate, isopropyl acrylate, butyl acrylate, 2-ethylhexyl acrylate, methylmethacrylate, butylmethacrylate; aromatic or aliphatic $\alpha$-$\beta$-unsaturated hydrocarbons such as ethylene, propylene, styrene, vinyltoluene; vinyl halides such as vinyl chloride; unsaturated nitriles such as acrylonitrile; diesters of maleic acid or fumaric acid, for example dibutyl maleate or dibutyl fumarate; $\alpha$-$\beta$-unsaturated carboxylic acids such as acrylic acid, methacrylic acid, or crotonic acid and derivatives thereof, for example acrylamide or methacrylamide.

When selecting the appropriate monomers or monomer combinations the generally acknowledged conditions for the manufacture of dispersion paints have to be considered. In the first place, care should be taken that polymers are formed which yield a coherent film under the drying conditions of the coat of paint and the monomers for making copolymers should be selected so that, depending on the respective polymerization parameters, the formation of copolymers with the halogen compounds can be expected. Some suitable monomers combinations are listed below:

vinyl acetate/butyl acrylate/chloro(bromo)-acetic acid vinyl ester,
vinyl acetate/butyl acrylate/$\beta$-chloroethylvinyl ether,
vinyl acetate/butyl acrylate/$\beta$-chloroethyl-(meth)acrylate,
vinyl acetate/dibutyl maleate/chloro(bromo)acetic acid vinyl ester,
vinyl acetate/dibutyl maleate/$\beta$-chloroethyl vinyl ether,
vinyl acetate/dibutyl fumarate/chloro(bromo)acetic acid vinyl ester,
vinyl acetate/isononanoic acid vinyl ester/chloro(bromo)acetic acid vinyl ester,
vinyl acetate/isononanoic acid vinyl ester/$\beta$-chloroethylvinyl ether,
vinyl acetate/isononanoic acid vinyl ester/$\beta$-chloroethyl(meth)acrylate,
vinyl acetate/2-ethylhexanoic acid vinyl ester/chloro(bromo)acetic acid vinyl ester,
vinyl acetate/2-ethylhexanoic acid vinyl ester/$\beta$-chloroethylvinyl ether,
vinyl acetate/vinyl ester of branched carboxylic acid with 10 carbon atoms (10-C-acid)/chloro(bromo)acetic acid vinyl ester,
vinyl acetate/10-C-acid vinyl ester/$\beta$-chloroethylvinyl ether,
vinyl acetate/ethylene/chloro(bromo)acetic acid vinyl ester,
vinyl acetate/ethylene/$\beta$-chloroethyl vinyl ether,
vinyl acetate/ethylene/ vinyl chloride/chloro(bromo)acetic acid vinyl ester,
vinyl acetate/ethylene/vinyl chloride/$\beta$-chloroethylvinyl ether.

When the dispersions are intended for use in paints having a high wet adhesion they should contain as little as possible emulsifier. When, however, dispersions are to be prepared having a satisfactory stability a certain amount of emulsifier must be added, especially if a small particle size is desired or if the polymerization is carried out in the absence of protective colloids. Moreover, in many cases an emulsifier is important to obtain a good wetting of the pigment and a good dispersion thereof in the manufacture of the paint. On the other hand, an excessive content of emulsifier may detrimentally affect important properties, for example the resistance to water. Consequently, the dispersions should contain at most 2% of ionic emulsifier and at most 4% of non-ionic emulsifier, calculated on the polymer content of the dispersion.

Suitable non-ionic emulsifiers are, for example, alkyl polyglycol ethers such as the ethoxylation products of lauryl, oleyl or stearyl alcohol or of mixtures such as coconut fatty alcohol; alkyl phenol polyglycol ethers such as the ethoxylation products of octyl- or nonyl-phenol, diisopropyl-phenol, triisopropyl-phenol or di- or tri- tert.butyl-phenol; or ethoxylation products of polypropylene oxide.

As ionic emulsifiers anionic emulsifiers are used in the first place, for example alkali metal or ammonium salts of alkyl, aryl or alkylaryl sulfonates, sulfates, phosphates, phosphonates, or compounds having different anionic end groups, oligo- or poly-ethylene oxide units possibly being contained between the hydrocarbon radical and the anionic group. Typical representatives are sodium lauryl sulfate, sodium octyl-phenol glycol ether sulfate, sodium dodecyl-benzene sulfonate, sodium lauryl diglycol sulfate, ammonium tri-tert.butyl-phenol penta- or octa-glycol sulfate.

As protective colloids there may be used natural substances such as gum arabic, starch, alginates, or modified natural substances such as a methyl, ethyl, hydroxyalkyl, or carboxymethyl cellulose, or synthetic substances, for example polyvinyl alcohol, polyvinyl pyrrolidone, or mixtures of the aforesaid substances.

Modified cellulose derivatives and synthetic protective colloids are preferred.

To initiate and continue polymerization oil-soluble and/or preferably water soluble radical forming agents or redox systems are used, for example hydrogen peroxide, potassium or ammonium peroxydisulfate, dibenzoyl peroxide, lauryl peroxide, tri-tert.butyl peroxide, bisazodiisobutyronitrile, either singly or together with reducing components, for example sodium bisulfite, Rongalite ®, glucose, ascorbic acid, and other compounds having a reducing action.

The following examples illustrate the invention, the parts being weight unless otherwise stated.

EXAMPLE 1

A polymerization mixture consisting of
  650 parts water
  12 parts nonylphenol polyglycol ether having about 30 ethylene oxide units per molecule
  12 parts of a copolymer of 90 parts N-vinyl-N-methylacetamide and 10 parts maleic acid diisooctyl ester
  1.5 parts sodium acetate
  0.9 part sodium vinylsulfonate
  2.5 parts ammonium peroxidisulfate
  48 parts vinyl acetate and
  12 parts 10-C-acid vinyl ester was heated while stirring in a 2 liter three-necked flask placed in a heating bath and equipped with stirrer, reflux condenser, dropping funnel and thermometer, whereby the polymerization was initiated. When the temperature had reached 70° C. a mixture of 216 parts vinyl acetate and 54 parts 10-C-acid vinyl ester was metered in during the course of approximately 90 minutes. Directly thereafter, a mixture of 216 parts vinyl acetate, 54 parts 10-C-acid vinyl ester and 18 parts chloroacetic acid vinyl ester was metered in during the course of a further 90 minutes, the total time of dosed addition being about 3 hours, the polymerization temperature was 70° C.

After termination of the monomer addition a solution of 0.3 part ammonium peroxidisulfate in 15 parts water was added, heating of the polymerization mixture (70° C.) was continued for 110 minutes, 23 parts hexamethylene tetramine in 40 parts water were slowly added, the mixture was stirred for another 10 minutes at 70° C. and then cooled.

The dispersion obtained had a pH of 6.1 and a solids content of about 50%.

EXAMPLE 2

In an apparatus as described in Example 1 a polymerization mixture consisting of
  618 parts water
  18 parts nonylphenol polyglycol ether having about 30 ethylene oxide units in the molecule
  1.5 parts sodium acetate
  12 parts hydroxyethyl cellulose having an average degree of polymerization of about 400 and a molecular weight of about 100,000
  2.5 parts ammonium peroxidisulfate
  48 parts vinyl acetate and
  12 parts dibutyl maleate were heated to 70° C. and at said temperature there were added, during the course of 90 minutes a mixture of 216 parts vinyl acetate and 54 parts dibutyl maleate and directly thereafter during the course of a further 90 minutes a mixture of 216 parts vinyl acetate, 54 parts dibutyl maleate and 18 parts bromoacetic acid vinyl ester. When the addition was terminated 0.5 part ammonium peroxidisulfate in 15 parts water was added and the dispersion was heated for a further 2 hours. One hour prior to cooling 40 parts ammonia of 25% strength were added whereby the pH was adjusted to 9.4. The dispersion had a solids content of about 50%.

EXAMPLE 3

In an apparatus as described in Example 1 a polymerization mixture consisting of
  625 parts water
  18 parts oleyl polyglycol ether having about 25 ethylene dioxide units in the molecule
  0.2 parts sodium dodecylbenzene sulfonate
  12 parts hydroxyethyl cellulose having an average degree of polymerization of about 400 (molecular weight about 100,000)
  1.5 parts sodium acetate
  2.5 parts ammonium peroxidisulfate and 63 parts of a monomer mixture composed of
  540 parts vinyl acetate
  150 parts isononanoic acid vinyl ester and
  30 parts chloroacetic acid vinyl ester was heated to 70° C. and the remaining monomer mixture (567 parts) was metered in over a period of 3 hours. When the addition was terminated 0.5 part ammonium peroxidisulfate in 15 parts water were added and heating was continued for a further 2 hours. One hour prior to cooling the pH of the dispersion was adjusted to 9.5 by adding 40 parts of ammonia of 25% strength. The dispersion had a solids content of about 50%.

EXAMPLES 4 to 7

Dispersions were prepared in the manner described in Example 3 with the exception that:
  in Example 4 ammonia was added to the dispersion cooled to room temperature (about 25° C.)
  in Example 5 no ammonia was added to the dispersion
  in Example 6 no chloroacetic acid vinyl ester was incorporated by polymerization, but ammonia was added at 70° C. one hour prior to cooling
  in Example 7 no chloroacetic acid vinyl ester was incorporated and no ammonia added.

To prepare the dispersion paints according to the invention having a high wet adhesion the dispersions obtained according to the preceding examples were blended with a pigment suspension. Pigment suspensions or pigment pastes of this type, which are suitable for making dispersion paints of low pigment content and especially gloss paints consist, for example, of titanium dioxide uniformly dispersed in water. They contain, in general, protective colloids such as cellulose derivatives, for example hydroxyethyl cellulose, and dispersing agents, for example salts of poly(meth)acrylic acid or sodium polyphosphate. Usual constituents of pignent suspensions are furthermore antimicrobic preserving agents, anti-foaming agents, pH stabilizers and fillers. Especially suitable titanium dioxide pigments are the rutile and anatase modifications. For the manufacture of gloss paints the average particle diameter of the pigment should be near the lower limit of the light wave length, i.e., at about 0.4 to 0.2 micron. For making dull paints of low pigment content special large surface silicate pigments could be concomitantly used. Dull paints of high binder content yield paint coatings that are easily to clean. The pigment paste may, of course, also contain colored pigments or the desired shade is obtained by adding a shading dyestuff to the dispersion paint containing the white pigment.

The pigment suspension can be prepared in known manner, for example by dispersing the pigment in a dissolver, a ball mill or sand mill. For use in gloss paints the pigment suspension should not contain noticeable amounts of pigment aggregates which would affect the gloss.

Auxiliaries such as plasticizers, cross linking agents, buffer substances, thickening agents, thixotropic agents, rust preventing agents, alkyd resins, or drying oils may be added to the dispersion or the dispersion paint. Suitable plasticizers are not the solvents initially mentioned as film consolidation agents with temporary action but compounds which reduce the film forming temperature and remain in the polymer for a longer period of time, for example dibutyl phthalate.

The use of the plastic dispersions prepared according to the invention as binder in dispersion paints of low pigment content and dispersions containing the aforesaid plastics dispersions also an object of the present invention.

To test the wet adhesion dispersion paints were prepared as follows:

1. First a pigment paste was prepared by introducing in the indicated order into a vessel with stirrer
   41.0 parts water
   15.6 parts of a 3% aqueous solution of Tylose ®H 20
   0.4 part Calgon ®N (solid)
   3.0 parts dispersing agent PA 30
   1.0 part ammonia of 25% strength
   2.0 parts of preserving agent
   3.0 parts of anti-foaming agent
and dispersing there-in
   175 parts of titanium dioxide having a particle size of from 0.2 to 0.4 micron with the use of a dissolver and adding
   10.0 parts propylene glycol.

This pigment paste was prepared in a large amount so that for the blends with the dispersions to be tested equal conditions, for example as regards the pigment dispersion, were ensured.

The pigment paste (1) was mixed with
2. 710 parts of the respective dispersion (with a solids content of 50%) which had been admixed with 2.0 parts ammonia of 25% strength if the pH did not exceed approximately 7.

To the pigment paint obtained a mixture
3. of 10 parts butyl diglycol acetate and 27.0 parts 1,2-propylene glycol
was then slowly added while stirring.

For the manufacture of the individual paints a corresponding proportion of the pigment paste was mixed, while slowly stirring, with the dispersion approximately 1 day old, whereupon the solvents mentioned sub(3) were added. After complete blending, the paints were passed through a sieve.

The paints were allowed to stand for 1 day and then spread on glass plates and steel sheets onto which a pigmented glossy air-drying alkyd resin enamel had been sprayed and which had been kept after drying for 24 hours at 100° C. A film applicator was used having a slit diameter of 200 microns. After a drying period of 24 hours the wet adhesion of the gloss paints was tested according to the two following methods.

(1) Abrasion test

The glass plates with the dried coating of dispersion paint were inserted in a mechanical abrasion device as described, for example, in German Offenlegungsschrift No. 2,262,956 and similar to the Gardner Washability and Abrasion Machine, but having a moving length of approximately 1.20 m in a manner such that the applied films of dispersion paint were in a vertical position with respect to the moving direction of the brush. Due to the long moving distance about 15 paints could be simultaneously tested in one run. A brush with hog's bristles was used which, at the beginning of the test, had been wetted with distilled water. During the test the area on which the brush moved was also wetted with distilled water so that the brushed areas were permanently covered with a water film. With a poor wet adhesion the dispersion paint was brushed off the substrate after a few movements of the brush and torn at the boundary between wetted and dry film. The wet adhesion is the better the higher the number of movements of the brush until the film is shifted aside. The dispersion paint has an optimum wet adhesion when in the wetted area the film is not damaged after 3,000 passages of the brush, one passage including a backward and forward stroke.

(2) Condensation test

A rectangular thermostat was used one half of which was filled with water of 50° C. and in the gas space of which above the water level a fan was mounted. The upper opening was covered with the steel sheets with the coated surface in downward position so that the thermostat was closed. The thermostat was kept in a room maintained at 23° C. Owing to the temperature difference steam condensed on the lower surface of the sheets and acted on the coats of paint. After 15 minutes of action the sheets were removed and the coatings evaluated.

With an unsatisfactory wet adhesion blisters form between the film of dispersion paint and the alkyd resin lacquer and the film can be easily shifted aside. A film having a good wet adhesion is still free of blisters after a period of 4 hours and cannot be shifted.

The test results are listed in the following Table.

| Example No. | abrasion test, number of double strokes of brush | stability in condensation test |
| --- | --- | --- |
| 1 | >3000 | >4 hours |
| 2 | >3000 | >4 hours |
| 3 | >3000 | >4 hours |
| 4 | 2000 | 2 hours |
| 5 | 400 | 25 minutes |
| 6 | 850 | 2 hours |
| 7 | 400 | 70 minutes |

What is claimed is:

1. A process for the manufacture of a dispersion paint having improved wet adhesion to smooth substrate surfaces comprising the steps of copolymerizing in an aqueous medium one or more mono-olefinically unsaturated monomers and from 0.5 to 10% by weight, based on the total weight of monomers, of a nucleophilically substitutable $\alpha,\beta$-unsaturated halogen compound, adding to the resulting dispersion while maintaining it at a temperature above 50° C. an alkaline agent selected from two equivalents of ammonia per equivalent of halogen and one mole of hexamethylene tetramine per mole of halogen compound, and blending a pigment paste with said dispersion to form said dispersion paint.

2. A process according to claim 1 wherein the halogen compound is added to the polymerization mixture after at least 40% and at most 80% of the other monomers have been polymerized.

3. A process according to claim 1 wherein said monodefinically unsaturated monomers are selected from the group consisting of vinyl esters of organic carboxylic acids having an acid moiety containing 1 to 30 carbon atoms, esters of acrylic acid and methacrylic acid having from 1 to 30 carbon atoms in the alchol moiety thereof, aromatic and aliphatic $\alpha,\beta$-unsaturated hydrocarbons, vinyl halides, unsaturated nitriles, diesters of maleic acid and fumaric acid, and $\alpha,\beta$-unsaturated carboxylic acids and amide derivatives thereof.

4. A process according to claim 1 wherein said pigment comprises less than 40% by volume of the solids content of said dispersion.

5. A process according to claim 1 wherein from 3 to 15% by weight of organic solvent is incorporated in said dispersion.

6. A process according to claim 5 and wherein said organic solvent is selected from the group consisting of polyhydric alcohols miscible with water and having up to 6 carbon atoms, monomethyl and monobutyl ethers of such polyhydric alcohols and monoglycol ethers of carboxylic acids.

7. A dispersion paint prepared by the process of claim 1.

8. A process for the manufacture of a dispersion paint having improved wet adhesion to smooth substrate surfaces comprising the steps of copolymerizing in an aqueous medium (a) one or more mono-olefinically unsaturated monomers and (b) from 0.5 to 10% by weight, based on the total weight of monomers, of an $\alpha,\beta$-unsaturated halogen compound selected from the group consisting of chloroacetic acid vinyl ester, bromoacetic acid vinyl ester, $\beta$-chloroethyl vinyl ether, $\beta$-chloroethylacrylate and $\beta$-chloroethyl methacrylate, adding to the resulting dispersion while maintaining it at a temperature above 50° C. an alkaline agent selected from two equivalents of ammonia per equivalent of halogen and 1 mole of hexamethylene tetramine per mole of halogen compound, and blending a pigment paste with said dispersion to form said dispersion paint.

* * * * *